(12) United States Patent
Biancale et al.

(10) Patent No.: US 12,198,418 B2
(45) Date of Patent: Jan. 14, 2025

(54) SYSTEM AND METHOD FOR MEASURING THE DISTANCE TO AN OBJECT IN WATER (71) Applicant: SEA.AI GmbH, Linz (AT)

(72) Inventors: Raphaël Biancale, Linz (AT); David Moser, Vienna (AT)

(73) Assignee: SEA.AI GmbH (AT)

( * ) Notice: Subject to any disclaimer, the term of this patent is extended or adjusted under 35 U.S.C. 154(b) by 821 days.

(21) Appl. No.: 17/292,392

(22) PCT Filed: Sep. 27, 2019

(86) PCT No.: PCT/EP2019/076330
§ 371 (c)(1),
(2) Date: May 7, 2021

(87) PCT Pub. No.: WO2020/099016
PCT Pub. Date: May 22, 2020

(65) Prior Publication Data
US 2022/0024549 A1    Jan. 27, 2022

(30) Foreign Application Priority Data

Nov. 15, 2018    (EP) .................................... 18206614

(51) Int. Cl.
*G06V 20/00*    (2022.01)
*B63B 43/18*    (2006.01)
(Continued)

(52) U.S. Cl.
CPC .............. *G06V 20/00* (2022.01); *B63B 43/18* (2013.01); *G01P 15/032* (2013.01); *G01S 13/93* (2013.01);
(Continued)

(58) Field of Classification Search
CPC ...... G06V 20/00; G06V 10/40; G06V 10/751; G06V 20/10; B63B 43/18; G01P 15/032;
(Continued)

(56) References Cited

U.S. PATENT DOCUMENTS

| 8,630,806 | B1* | 1/2014 | Zhu | ........................ G08G 1/165 |
| | | | | 701/523 |
| 2009/0290809 | A1* | 11/2009 | Yamada | ................. H04N 19/17 |
| | | | | 382/266 |

(Continued)

FOREIGN PATENT DOCUMENTS

EP    2053844 A1    4/2009
EP    2866048 A1    4/2015
(Continued)

OTHER PUBLICATIONS

Haghbayan, Mohammad-Hashem, et al. "An efficient multi-sensor fusion approach for object detection in maritime environments." 2018 21st International Conference on Intelligent Transportation Systems (ITSC). IEEE, 2018. (Year: 2018).*

(Continued)

*Primary Examiner* — Jonathan S Lee
(74) *Attorney, Agent, or Firm* — Tom H. Dao (57) ABSTRACT

The invention relates to a system for determining the distance between a boat and at least one object at least partially immerged in a water area, said system comprising a capturing module, configured to be mounted on said boat, for example on a mast, said capturing module comprising at least one camera, said at least one camera being configured to generate at least one sequence of images of said water area, and a processing module, configured to be embedded onboard said boat, said processing module being configured to receive the at least one sequence of images from said at least one camera, to detect at least one object in said at least one received sequence of images and to determine the distance between the boat and the at least one detected object using the received sequence of images.

15 Claims, 5 Drawing Sheets

(51) Int. Cl.

| | |
|---|---|
| *G01P 15/03* | (2006.01) |
| *G01S 13/93* | (2020.01) |
| *G01S 17/93* | (2020.01) |
| *G05D 1/00* | (2006.01) |
| *G05D 1/693* | (2024.01) |
| *G06N 3/02* | (2006.01) |
| *G06T 7/55* | (2017.01) |
| *G06V 10/40* | (2022.01) |
| *G06V 10/75* | (2022.01) |
| *G06V 20/10* | (2022.01) |

(52) U.S. Cl.
CPC ............ *G01S 17/93* (2013.01); *G05D 1/0206* (2013.01); *G05D 1/693* (2024.01); *G06N 3/02* (2013.01); *G06T 7/55* (2017.01); *G06V 10/40* (2022.01); *G06V 10/751* (2022.01); *G06V 20/10* (2022.01); *G06T 2207/10016* (2013.01); *G06T 2207/10024* (2013.01); *G06T 2207/10048* (2013.01); *G06T 2207/20084* (2013.01)

(58) Field of Classification Search
CPC ....... G01S 13/93; G01S 17/93; G05D 1/0206; G06N 3/02; G06T 7/55; G06T 2207/10016; G06T 2207/10024; G06T 2207/10048; G06T 2207/20084
USPC ........................................................ 356/5.01
See application file for complete search history.

(56) References Cited

U.S. PATENT DOCUMENTS

| | | |
|---|---|---|
| 2015/0276923 A1 | 10/2015 | Song et al. |
| 2017/0109891 A1 | 4/2017 | Mosher et al. |
| 2017/0323154 A1 | 11/2017 | Kollmann et al. |
| 2021/0357655 A1* | 11/2021 | Park .................. G06T 7/50 |

FOREIGN PATENT DOCUMENTS

| | | |
|---|---|---|
| EP | 3242248 A1 | 11/2017 |
| WO | WO 2017/136014 A2 | 8/2017 |

OTHER PUBLICATIONS

Extended European Search Report from the European Patent Office on corresponding EP application (EP18206614.2) dated Jul. 10, 2019.
International Search Report and Written Opinion on corresponding PCT application (PCT/EP2019/076330) from International Searching Authority (EPO) dated Dec. 16, 2019.
International Search Report and Written Opinion on corresponding PCT application (PCT/EP2019/076329) from International Searching Authority (EPO) dated Feb. 10, 2020.
Azzabi, Tarek, Samir Belhaj Amor, and Samir Nejim, "Obstacle Detection for Unmanned Surface Vehicle", Proc. International Conference on Electrical Sciences and Technologies in Maghreb (CISTEM). 2014. (Year: 2014), 2 pages.
Larson, Jacob, et al. "Advances in autonomous obstacle avoidance for unmanned surface vehicles." AUVSI unmanned systems North America 2007 (2007). (Year: 2007).
Mou, Xiaozheng, and Han Wang, "Wide-baseline stereo-based obstacle mapping for unmanned surface vehicles", Sensors 18.4 (2018): 1085. (Year:2018), 14 pages.
Polvara, Riccardo, et al. "Obstacle avoidance approaches for autonomous navigation of unmanned surface vehicles." The Journal of Navigation 71.1 (2018): 241-256. (Year: 2018).
Prasad, Dilip K., et al. "Challenges in video based object detection in maritime scenario using computer vision." arXiv preprint arXiv: 1608,01079 (2016). (Year: 2016).
Notice of Allowance on related (U.S. Appl. No. 17/292,359) dated Oct. 3, 2023.
Non-Final Office Action on related (U.S. Appl. No. 17/292,359) dated May 25, 2023.

* cited by examiner

SYSTEM AND METHOD FOR MEASURING THE DISTANCE TO AN OBJECT IN WATER

TECHNICAL FIELD

The invention relates to the detection of an object in water and more particularly to a system and method for measuring the distance between a boat and an object at least partially immerged in water such as e.g. an ocean, a sea or a lake. The present invention aims in particular at providing an efficient solution for assisting a skipper while driving a boat.

BACKGROUND

Boats navigating in the oceans may collide with various types of animals, such as e.g. whales, or things such as e.g. containers or pieces of debris or other boats. Such collisions may damage the hull of the boat or even sink the boat.

There exists a plurality of systems in the prior art for detecting immerged objects such as animals or things using sonar-based technologies. However, these systems are not adapted to detect a floating object when said floating object is not significantly immerged.

In order to solve this problem, systems based on RADAR or LIDAR technologies have been developed to detect objects partially immerged in water. However, RADAR systems do not allow to detect all types of floating objects, while LIDAR systems allow detecting most types of floating objects, but do not allow identifying said floating objects at distances above 200m due to eye safe laser power limitations and limited spatial resolution, therefore not knowing if the object may further move, e.g. like a whale, or merely remain at place, e.g. like a container. Yet, it may be important to identify the type and/or the accurate size of the object. Furthermore, it may also be important to estimate the trajectory of the object in order to maneuver the boat and thus securely avoid the object.

A solution described in patent application FR 3 045 991 A1, filed by the Applicant, uses an emitter that send signals that reflect on floating objects. The reflected signals are processed by an analyzing module that detects floating objects. However, the signals used in this solution may be deviated and not reflect toward the receiver, which does not allow to detect objects, or may be modified in such a manner that they cannot allow the detection of some objects. Moreover, this solution does not allow to detect object that are totally immerged in water. Furthermore, this solution does not allow to determine accurately the distance between the boat and the object in order to allow the skipper or the automatic pilot to modify the trajectory of the boat consequently and therefor safely avoid the object.

There is thus a need for a reliable and efficient solution that allows to identify an object which is at least partially immerged in water, in particular in order to take any required action to avoid colliding with said object. There is also a need for a reliable and efficient solution that allows to determine the distance between a boat and an object which is at least partially immerged in water, in particular in order to take any required action to avoid colliding with said object.

SUMMARY

To this aim, the invention provides a system for determining the distance between a boat and at least one object at least partially immerged in a water area (i.e a body of water), said system comprising:

a capturing module, configured to be mounted on said boat, for example on a mast, said capturing module comprising at least one camera, said at least one camera being configured to generate at least one sequence of images of said water area, a processing module, configured to be embedded onboard said boat, said processing module being configured to receive the at least one sequence of images from said at least one camera, to detect at least one object in said at least one received sequence of images and to determine the rotation component values of the at least one camera in a boat reference frame, wherein said boat reference frame is vehicle-carried and comprises the plane defined by the water area and a vertical axis normal to said plane, and to determine the distance between the boat and the at least one detected object using said rotation component values.

The system according to the invention allows therefore determining the distance to the at least one detected object using a sequence of images in order to allow the skipper or the boat autopilot to modify the trajectory of the boat to efficiently and safely bypass said at least one detected object. Using the images of the capturing module is a simple, efficient and reliable manner to derive the distance between the boat and the at least one detected object.

In a first embodiment, the system comprises an inertial measurement module, coupled to the capturing module, said inertial measurement module comprising a gyroscope configured to generate spatial data, said spatial data comprising the angular positions of the boat along the roll, pitch and yaw axes of the boat, the processing module being configured to:

receive the spatial data from the inertial measurement module, calculate the coordinates of the at least one object in a boat reference frame using the received sequence of images and the received spatial data, calculate the distance between the boat and the at least one detected object using the calculated coordinates.

Calculating the coordinates of the object allows deriving directly its distance from the boat, in particular when no other distance estimation is possible with other techniques like e.g. using the horizon (second embodiment here after).

Advantageously, the calculation of the coordinates of the at least one object in the boat reference frame comprises applying rotations and translations between coordinate systems of the image plane of the at least one camera and the capturing module using the received sequence of images and between the capturing module and the boat reference frame.

The term "coupled" means that the inertial measurement module is mounted in the capturing module or on the capturing module or next to the capturing module the capturing module, for example at the same height of the mast of the boat.

In a second embodiment, the system may be deprived of inertial measurement module and the processing module is configured to detect the horizon in the received sequence of images, to determine the inclination of the capturing module in respect to the water surface of the water area. Using this inclination, the kinematic relationships on the boat and considering that the water surface is a plane, a transformation between each pixel in the image and the corresponding position on the water is determined. By combining this relative position with GPS data, for example available on a boat navigation bus, it is then possible to assign an absolute position to each pixel. Tracking an object through several images with time stamps allows to calculate speed and course of the object with a tolerance dependent of the distance to the camera. For the distance calculation, the lowest part of the object may be taken as a reference as it is assumed that water is flat and that the object water line is lowest part of the object itself. Considering the center pixel of the lower object part in the correspondence between the pixel and water plane allows thus estimating the distance between the capture module and the object.

In a third embodiment, the system comprises a LIDAR or a RADAR or a stereo vision device configured for measuring 3D environmental data and estimating the inclination of the capturing module, e.g. in an open sea scenario, by delivering 3D point clouds of the environment, mostly consisting of the water plane, to derive said water plane by removing outliers (e.g. using an algorithm like e.g. RANSAC and in addition the plane could simply be calculated using least squares method), and taking into account that the water surface is the xy-plane of the boat reference coordinate system or frame to calculate the inclination of the capturing module from said plane equation.

According to an aspect, the processing module is configured to identify the at least one detected object.

The processing module comprises at least one artificial neural network for detecting at least one object, said at least one artificial neural network being configured to detect the at least one object in the at least one received sequence of images, to extract a set of features from said at least one detected object, to compare said extracted set of features with at least one predetermined set of features associated with a predefined object, and to identify the at least one detected object when the extracted set of features matches with the at least one predetermined set of features.

The use of at least one camera and at least one artificial neural network allows both detecting and identifying detected objects, in particular efficiently and rapidly. The use of at least one camera allows generating images of the water and prevent using signals that could be lost or modified during transmission. An artificial neural network is a straight, easy and efficient way to process images generated by the at least one camera in order to detect, identify and track objects at least partially immerged in water. Predetermined set of features may be materialized into classes associated with known objects, for example boats, buoys, whales, containers. The artificial neural network is thus trained onto these classes in order to identify the objects. The system according to the invention allows in particular to prevent an object to damage a boat or a structure like e.g. a sea wind turbine, a signal buoy or a dock. The system according to the invention allows in particular to monitor a restricted water area to prevent trespassers, for example at a border or in a marine park or in a military zone. The term "object" covers any kind of item, like e.g. a container or a piece of debris or another boat, or any animal, like e.g. a whale or a dolphin, that could be encountered in water and that the system can detect. The terms "at least partially immerged" mean that the object is either floating or is totally immerged. In the latter case, a camera of the system may be configured to generate images showing objects immerged, for example up to 2 meters under the surface in clear water.

According to an aspect of the invention, the capturing module is adapted to be mounted on an elevated point, preferably at a height greater than two meters relatively to the floating line or to the surface of the water. In an embodiment, the capturing module is adapted to be mounted on a boat, such as e.g. the top of a mast of a sailing boat or an elevated point of a motor boat. The boat may be a sailing boat or a motor boat. The capturing module may be adapted to be mounted on an elevated point of a structure such as e.g. a post or a building of a cost or a dock, a sea wind turbine, or any adapted location allowing the use of the system.

In one embodiment, the capturing module and the processing module are implemented on a single physical entity, preferably mounted on an elevated point such as e.g. a mast of a sailing boat.

In another embodiment, the capturing module and the processing module are implemented on two separate physical entities. For example, the capturing module may be mounted on an elevated point of a boat or of a structure arranged in a water (e.g. a sea wind turbine) or of a shore (e.g. a dock) and the processing module may be mounted inside a boat or on the land. In this case, the capturing module and the processing module may be configured to communicate on a wire communication interface (e.g. using an Ethernet-type link) when they are close enough or widely on a wireless communication interface such as e.g. a Wifi, broadband (4G, 5G . . . ) or satellite interface.

In an embodiment, the processing module is implemented on a server which is connected to one or a plurality of capturing modules via a communication network (e.g. of the Wifi, broadband (4G, 5G . . . ), satellite, or wire type, etc.). Such a configuration allows using a server on the land, which may have important processing capabilities to process at the time several different sequences of images received from several capturing modules. The server may be configured to send an alert, for example to a boat, when an object is identified and may become a danger. Embedding only a capturing module onboard a boat also allows reducing the weight of the boat, which might be important for race boats.

In an embodiment, the system comprises an inertial measurement module configured to provide spatial data, said spatial data comprising at least the inclination angle, relatively to the terrestrial horizontal axis (horizon), of the support on which the capturing module is mounted, for example the inclination of the mast or the boat. To this end, the inertial measurement module may comprise a gyroscope or any relevant device adapted to provide such inclination angle.

According to an aspect of the invention, the processing module is configured to receive the inclination angle of the support on which the capturing module is mounted.

According to an aspect of the invention, the processing module is configured to compensate each image of the sequence of images using the received inclination angle.

According to an aspect of the invention, the processing module is configured to detect the horizon in each image of the sequence of image, for example using methods like edge detection and or water segmentation performed by the artificial neural network. The horizon detection allows to maximize the accuracy of the distance calculation of the detected object by knowing precisely where the horizon is in the image. Indeed, by adding or calculating the parameter of the height of the camera above the water, it is possible to assign each pixel to a specific distance with higher tolerance when nearing the horizon.

According to an aspect of the invention, the processing module is configured to segment, preferably using the detected horizon, each compensated image in at least one focusing area comprising the water area. Such segmentation allows reducing the processing power by reducing the size of the image to be processed. Advantageously, a part slightly above the horizon down to the front of the boot are included in the focusing area to detect object that may rise above the horizon.

Advantageously, the at least one camera is a RGB (Red Green Blue) camera or a thermal camera. A RGB camera is relatively simple and inexpensive in comparison to a thermal camera, but do not allow visibility at night unless the object is illuminated. A thermal camera allows analyzing images even when the environment is dark, in particular at night. Both RGB and thermal camera allow detecting efficiently a moving object such as e.g. an animal.

Advantageously, the at least one camera is configured to generate images of the water area in a field of view between 20 and 360°.

Advantageously, each RGB camera is configured to generate images of the water area in a field of view between 20 and 360°, preferably of at least 70°, for example 110, 120°, 180°, 185° or 360° angle.

In an embodiment, the capturing module comprises one RGB camera configured to capture images on a field of view of at least 90°, advantageously 160°, preferably 185°. This type of capturing module is inexpensive and hence particularly adapted for cruise sailing boats that navigate at day time and stop at night.

In an embodiment, the capturing module comprises two identical cameras adapted to capture images of the water area on a 185° angle each and arranged to capture images of the water area on a 360° field of view.

Each RGB camera may comprise a polarizing filter that make it easier to detect and identify an object almost immersed or totally immerged in the water.

Preferably, the capturing module comprises at least one RGB camera and at least one thermal camera.

In another embodiment, the capturing module comprises one RGB camera, which is for example configured to capture images on a field of view of at least 90°, preferably around 110 to 130°, and two thermal cameras. This type of capturing module is particularly adapted for race sailing boats that navigate fast and indistinctively both at day time and night time. Indeed, in this case, due to the relatively high speed of the boat, the capturing module needs mainly to focus on detecting objects which could be soon on the trajectory of the boat. Reducing the field of view of the RGB camera allows therefore reducing the size of the zone to process and thus the processing time for detection, which becomes more important as the speed of the boat increases. The use of two thermal cameras, for example covering each a 20°—field of view, hence covering in total a 40°—of field of view, allows focusing on the front of the boat when navigating at night, which is important for speed boat such as race sailing boat or race motor boat.

In a preferred embodiment, the processing module is configured to track the at least one identified object in the at least one sequence of images by analyzing the position of the detected object in each image of the sequence of images. Advantageously, the processing module is configured to estimate the distance and/or speed and/or course of the detected object using the at least one received sequence of images. The estimation of the distance may be performed by detecting the horizon in at least one image of the sequence of images. Using the horizon and the position of the camera through the inertial measurement module, it is possible to correlate each pixel with a position in the environment by considering that the water surface is flat. By combining this relative position with GPS data, for example available on a boat navigation bus, it is then possible to assign an absolute position to each pixel. Tracking an object through several images with time stamps allows to calculate speed and course of the object with a tolerance dependent of the distance to the camera. For the distance calculation, the lowest part of the object may be taken as a reference as it is assumed that water is flat and that the object water line is lowest part of the object itself. Considering the center pixel of the lower object part in the correspondence between the pixel and water plane allows thus estimating the distance between the capture module and the object.

In an embodiment, the artificial neural network is a convolutional neural network (CNN), suitable for detection, classification and or segmentation. This can be a region-based convolutional neural network (R-CNN), a single shot multibox detector (SSD), a you only look once (YOLO) CNN or one of the several closely related implementations. The neuronal network can also be extended to include the time domain by respecting not only the image data on current time stamp but also including information of previously processed images, combining feature over several time steps using recurrent neuronal networks (RNN).

In an embodiment, when the object cannot be identified, the processing module is configured to store images of said unidentified object in order to further identify said object, for example in a learning process or using human assistance, which will further enable increasing the number of predetermined set of features of the system.

Advantageously, the processing module is configured to generate information data related to the at least one identified object, such as e.g. the type of object, the size of the object, the speed of the object, the trajectory of the object, etc.

In an embodiment, the processing module is configured to generate navigation data, such as e.g. a new course of the boat and/or a new speed of the boat and/or a new engine power request, that allow to avoid a detected object.

According to an aspect of the invention, the processing module is configured for sending navigation data to an electronic control module of the boat in order to automatically (i.e. without anyone's action) modify the trajectory of the boat and therefore automatically avoid colliding with the identified object.

In a preferred embodiment, the system comprises an application module configured to display information related to the at least one identified object.

The application module may be operated by a fixed or a mobile user equipment, such as e.g. a smartphone, a tablet, a PC, a connected watch, etc.

For example, the application module may be configured to display information such as e.g. the type of object, the size of the object, the speed of the object, etc.

The invention also relates to a server implementing at least one processing module and which is connected to at least one capturing module, preferably a plurality of capturing modules, via a communication network (e.g. of the Wifi, broadband (4G, 5G . . . ), satellite, or wire type, etc.). Such a configuration allows using a server on the land, which may have important processing capabilities to process at the time several different sequences of images received from several capturing modules. The server may be configured to send an alert, for example to a boat, when an object is identified and may become a danger.

The invention also relates to a boat comprising a system as previously described.

In an embodiment, the boat comprises a mast, the capturing module being mounted on said mast, preferably at the top of the mast.

The invention also relates to a method of determining the distance between a boat and at least one object at least partially immersed in a water area (i.e a body of water), said method comprising the steps of generating at least one sequence of images of said water area, detecting at least one object in said at least one received sequence of images and determining the distance between the boat and the at least one detected object using the received sequence of images.

In a first embodiment, the system comprising an inertial measurement module, coupled to the capturing module, said inertial measurement module comprising a gyroscope configured to generate spatial data, said spatial data comprising the angular position of the boat along the roll, pitch and yaw axes of the boat, the method comprises the steps of:
- receiving the spatial data from the inertial measurement module,
- calculating the coordinates of the at least one object in a boat reference frame using the received sequence of images and the received spatial data,
- calculating the distance between the boat and the at least one detected object using the calculated coordinates.

Advantageously, the calculation of the coordinates of the object in the boat reference frame comprises applying rotations and translations between the at least one object and the capturing module and between the capturing module and the boat reference frame using the received sequence of images.

The term "coupled" means that the inertial measurement module is mounted in the capturing module or on the capturing module or next to the capturing module the capturing module, for example at the same height of the mast of the boat.

In a second embodiment, the system may be deprived of inertial measurement module and the method comprises the steps of detecting the horizon in the received sequence of images, determining the inclination of the capturing module in respect to the water surface. Using this inclination, the kinematic relationships on the boat and considering that the water surface is a plane, a transformation between each pixel in the image and the corresponding position on the water is determined. By combining this relative position with GPS data, for example available on a boat navigation bus, it is then possible to assign an absolute position to each pixel. Tracking an object through several images with time stamps allows to calculate speed and course of the object with a tolerance dependent of the distance to the camera. For the distance calculation, the lowest part of the object may be taken as a reference as it is assumed that water is flat and that the object water line is lowest part of the object itself. Considering the center pixel of the lower object part in the correspondence between the pixel and water plane allows thus estimating the distance between the capturing module and the object.

In a third embodiment, the system comprises a LIDAR or a RADAR or a stereo vision device and the method comprises the steps of measuring 3D environmental data and estimating the inclination of the capturing module in an open sea scenario by delivering 3D point clouds of the environment mostly consisting of the water plane to derive said water plane by removing outliers (using an algorithm like e.g. RANSAC and in addition the plane could simply be calculated using least squares method), and taking into account that the water surface is the xy-plane of the reference coordinate system to calculate the inclination of the capturing module from the plane equation.

According to an aspect, the method comprises a step of identifying the at least one detected object.

Advantageously, the method comprises the step of generating at least one sequence of images of said water area and identifying at least one object in said at least generated sequence of images using an artificial neural network, wherein the identification step comprises the sub-steps of detecting at least one object in the at least one generated sequence of images, of extracting a set of features from said at least one detected object, of comparing said extracted set of features with at least one predetermined set of features associated with a predefined object, and of identifying the at least one object when the extracted set of features matches with the at least one predetermined set of features.

Advantageously, the at least one sequence of images is generated by at least one camera which is a RGB (Red Green Blue) camera or a thermal camera.

Preferably, at least one sequence of images is generated by at least one RGB camera and at least one sequence of images is generated by at least one thermal camera. The at least one sequence of images generated by the at least one RGB camera may be processed to identify objects during day time or to identify illuminated objects during night time (for example a boat displaying identification lights based on said lights color and layout). The at least one sequence of images generated by the at least one thermal camera may be processed to identify objects during both day and night time. The at least one sequence of images generated by at least one RGB camera and the at least one sequence of images generated by at least one thermal camera may also be processed at the same time, for example by two different artificial neural networks.

In an embodiment, at least one sequence of images is generated by one RGB camera and at least one sequence of images is generated by one thermal camera. This configuration is particularly adapted for cruise sailing boats that navigate at day time and stop at night.

In another embodiment, at least one sequence of images is generated by one RGB camera and at least two sequences of images are generated by two thermal cameras. This configuration is particularly adapted for boats that navigate fast and indistinctively both at day time and at night time, in particular for race sailing boats and yachts.

According to an aspect of the invention, the method comprises a step of receiving an inclination angle, relatively to the terrestrial horizontal axis, of the support on which the capturing module is mounted.

According to an aspect of the invention, the method comprises a step of compensating each image of the sequence of images using the received inclination angle.

According to an aspect of the invention, the method comprises a step of detecting the horizon in each image of the sequence of image, for example using methods like edge detection and or water segmentation performed by the artificial neural network. The horizon detection allows maximizing the accuracy of the distance calculation of the detected object by knowing precisely where the horizon is in the image. Indeed, by adding or calculating the parameter of the height of the camera above the water, it is possible to assign each pixel to a specific distance with higher tolerance when nearing the horizon.

According to an aspect of the invention, the method comprises a step of segmenting, preferably using the detected horizon, each compensated image in at least one focusing area comprising the water area. Such segmentation allows reducing the processing power by reducing the size of the image to be processed. Advantageously, a part slightly above the horizon down to the front of the boot are included in the focusing area to detect object that may rise above the horizon.

Advantageously, the method comprises a step of estimating the distance and/or speed of the detected object using the at least one received sequence of images. The estimation of the distance may be performed by detecting the horizon in at least one image of the sequence of images and determining the inclination of the capturing module in respect to the water surface. Using this inclination, the kinematic relationships on the boat and considering that the water surface is a plane, a transformation between each object in the image and the corresponding position (which includes the distance to the object) on the water is determined. The estimation of the speed may be performed by detecting the horizon several consecutive images of the sequence of images, counting the number of pixels between the horizon and the object for each image and analyze the variation of the pixels to determine the speed.

In a preferred embodiment, the method comprises a step of tracking the at least one identified object in the at least one sequence of images by analyzing the position of the detected object in each image of the sequence of images.

In an embodiment, the artificial neural network is a convolutional neural network (CNN), preferably a region-based convolutional neural network (R-CNN).

According to an aspect of the invention, the capturing module being mounted onboard a boat, the method comprises a step of sending navigation data to an electronic control module of said boat in order to automatically (i.e. without anyone's action) modify the trajectory of the boat and therefore automatically avoid colliding with a detected or identified object.

According to one aspect of the invention, the method comprises a step of displaying information related to the at least one identified object.

In an embodiment, the capturing module sends the at least one generated sequence of images to the processing module on a wire communication link or on a wireless communication link.

DETAILED DESCRIPTION

The system according to the invention allows to detect objects in water and to determine the distance between said boat and said objects. For example, the system may be configured to detect pieces of debris, containers, wrecks, boats, navigation buoys, marine animals, ice blocks, whales, orcas or any type of object which are at least partially immersed in water, for example in an ocean, a sea or a lake.

In a preferred embodiment, the system is adapted to be mounted on a structure, preferably onboard a boat, for example on a mast of a sailing boat. The system according to the invention will thus be described hereafter in its use onboard a sailing boat. However, this does not restrict the scope of the present invention as the system according to the invention could also be used onboard any other type of boat, or on a platform (e.g. an oil platform), a sea wind turbine, in a marine park, or any kind of fixed structure of a lake shore or of a sea shore (such as e.g. a lighthouse or any port structure).

The system according to the invention identifies objects that are in the environment of the boat and preferably objects that could meet the trajectory of the boat while navigating.

Figure 1:
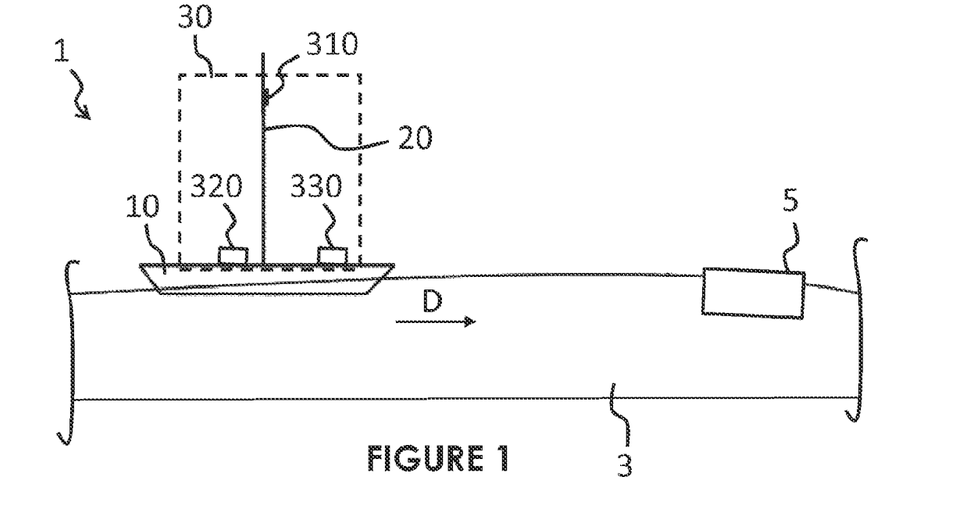
FIG. 1 illustrates an exemplary embodiment of a boat according to the invention.
Figure 2:
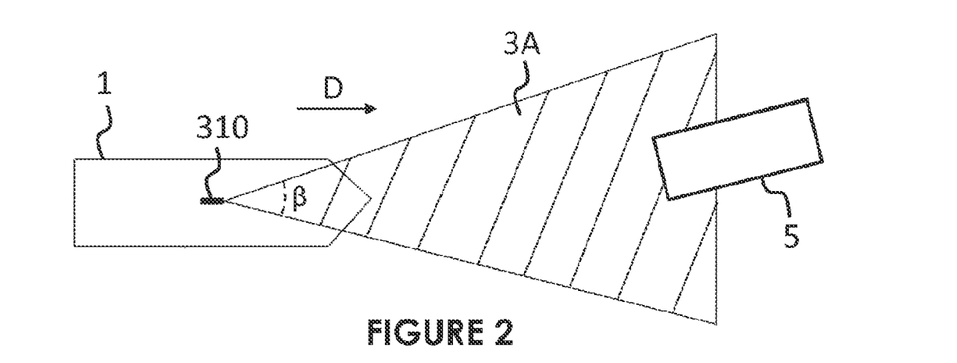
FIG. 2 is a top view of the boat of FIG. 1.

In the embodiment described below with reference to FIGS. 1 and 2, the boat 1 navigates in a predetermined direction D on a stretch of water called a body of water or water area 3, located in a navigation zone in which there is an object 5. The boat 1 comprises a hull 10, a mast 20 and a system 30 for detecting objects 5 in a detection zone 3A of the water area 3.

Figure 3:
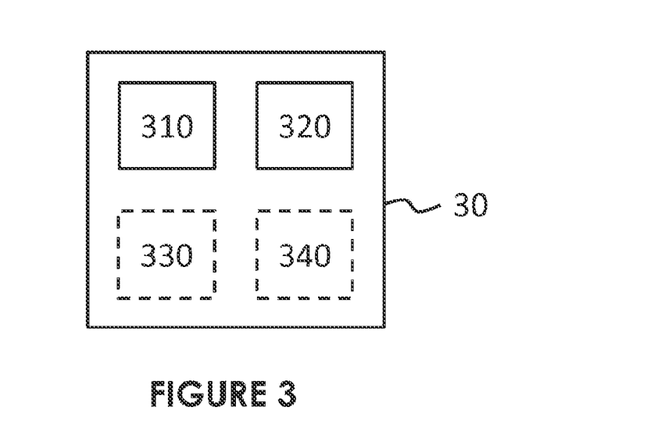
FIG. 3 illustrates schematically a functional view of the system according to the invention.

As illustrated on FIG. 3, the system 30 comprises a capturing module 310 and a processing module 320. In the embodiment described hereafter, the boat 1 advantageously further comprises an application module 330 and an inertial measurement module 340 that is configured to send its data to the processing module 320.

In the embodiment described hereafter, the capturing module 310 and the processing module 320 are implemented on two separate physical entities. The capturing module 310 is preferably mounted on any part of the boat 1, providing said height is high enough, for example more than two meters high above the water, preferably more than five meters high above the water surface level of the water area 3. For example, in the case of a sailing boat 1, the capturing module 310 is preferably mounted on the top of the mast 20. In another embodiment, the capturing module 310 and the processing module 320 could be implemented on a single physical entity, preferably mounted on the top of the mast 20 of the boat 1.

Figure 9:
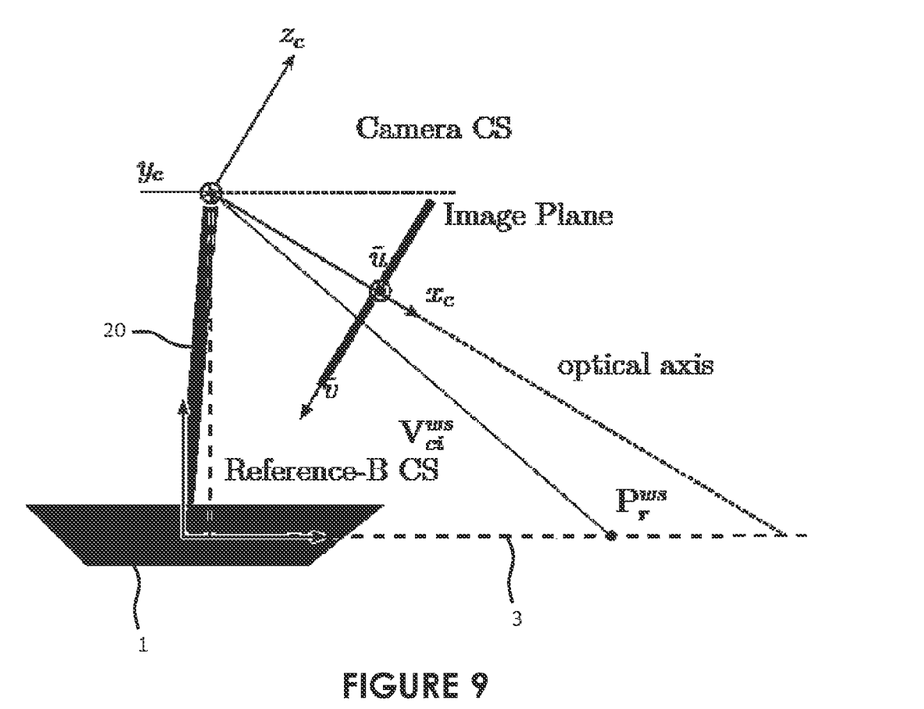
FIG. 9 illustrates the use of the image plane to calculate the distance of a point from the boat.

The capturing module 310 comprises at least one camera 315 (FIG. 9), for example a RGB (Red Green Blue) camera 315 or a thermal camera 315, which is configured to generate a sequence of images of at least a part of the water area 3. Preferably, the capturing module 310 comprises a motorization unit (not shown) that allows to adjusting the position of the capturing module 310 with respect to the horizon in order to avoid correcting the images before processing. This adjustment may consist, for example, in compensating the capturing module 310 in order to ensure that said capturing module 310 remains horizontal (terrestrial horizontal) or to compensate the rotation of the mast 20 in the case the mast 20 is rotatably mounted on the deck of the boat 1. Furthermore the rotation of the capturing module 310 may be used to swivel the inertial measurement module 340 to increase the field of view.

A RGB camera is a camera equipped with a standard CMOS sensor through which the colored images of persons and objects are acquired. The acquisition of static photos is usually expressed in megapixels (e.g., 12MP, 16MP) that define the number of pixels (i.e., length x height) that compose a photo. While, the acquisition of videos is usually expressed with explicative terms such as Full HD (i.e., 1080×1920 pixels with 30 frames per second) or Ultra HD (i.e., 3840×2160 pixels with 30/60 frame per second). The RGB camera(s) could be of the RGB-D type which generates images augmented with depth information. Such a RGB-D camera provides simultaneously a standard image and a depth map indicating the depth of the objects represented on said image.

A thermal camera (also called infrared camera or thermal imaging camera) is a device that forms an image using infrared radiation, similar to a common camera that forms an image using visible light. Instead of the [400-700] nanometer range of the visible light camera, infrared cameras operate in wavelengths as long as 14,000 nm (14 µm). The use of at least one thermal camera allows using the system 30 at night when a human operator or a RGB camera do not have visibility or brightness sufficient to detect objects 5 in a water area 3.

Figure 4:
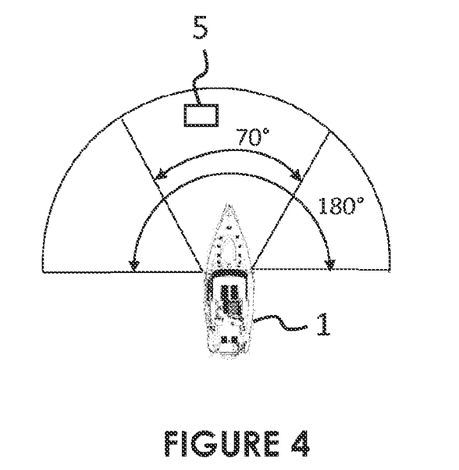
FIG. 4 illustrates schematically a first configuration of cameras.

In a first arrangement, described on FIG. 4 and adapted in particular for cruise sailing boats 1, the capturing module 310 comprises one RGB camera and one thermal camera (not shown). In this embodiment, the RGB camera is configured to generate images of the water area 3 in a field of view of around 180° in front of the boat 1. The thermal camera is configured to generate images of the water area 3 in a field of view of around 70° to reduce processing load and price in comparison to wider fields of view, making the system 30 affordable for most of consumers. In this embodiment, the capturing module 310 might comprise more than one thermal camera in order to widen the field of view if necessary. In a cruising sailing boat configuration, the capturing module 310 might comprise a second RGB camera with a 185° field of view (to create an overlap with the field of view of the first RGB camera) facing rearward in order to be able to identify object 5 on a 360° field of view around the boat 1.

Figure 5:
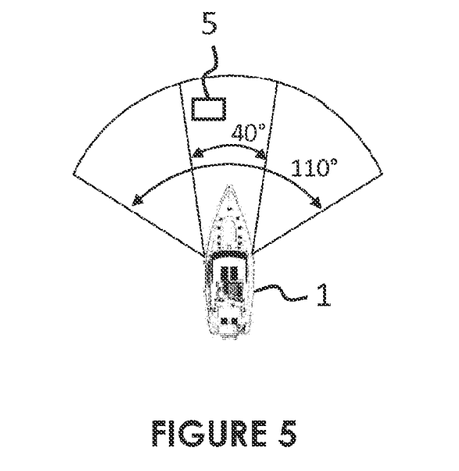
FIG. 5 illustrates schematically a second configuration of cameras.

In a second arrangement, described on FIG. 5 and adapted in particular for race sailing boats 1, the capturing module 310 comprises one RGB (Red Green Blue) camera and two thermal cameras (not shown). In this embodiment, the RGB camera is configured to generate images of the water area 3 in a field of view of around 110° in front of the boat 1. A first thermal camera is configured to generate images of the water area 3 in a field of view of around 20°-25° on the left side of the course of the boat 1 and a second thermal camera is configured to generate images of the water area 3 in a field of view of around 20°-25° on the right side of the course of the boat 1 (around 40° in the example of FIG. 5). In this configuration, the total field of view is less than 180° in the course of the boat 1 as a race sailing boat does not need to identify objects 5 which are on the sides or behind the course of the boat 1, due to its speed which is relatively high (up to 50 knots) in comparison of the speed of the objects 5 that could damage the hull 10 of the boat 1 during a collision. Also, a narrow total field of view allow to increase the resolution and the accuracy of the system while reducing the processing load of the generated images in order to have a fast and reactive system 30. Another advantage of using two thermal cameras on race sailing boats 1 is to avoid using a motorization unit to compensate boat movements. Indeed, also, the use of two thermal cameras allows identifying objects 5 at a further distance which is important because of the high speed that could reach the boat 1.

Of course, in other embodiments of the capturing module 310, the number and types of cameras 315 as well as their field of view could be different.

The processing module 320 comprises an artificial neural network (not shown) that will be described hereafter. In a preferred embodiment, the artificial neural network is a convolutional neural network (CNN) suitable for detections and classification and or segmentation. This can be a region-based convolutional neural network (R-CNN), a "single shot multibox detector" (SSD), a "you only look once" (YOLO) CNN or one of the several closely related implementations. The neuronal network can also be extended to include the time domain by respecting not only the image data on current time stamp but also including information of previously processed images, combining feature over several time steps using recurrent neuronal networks (RNN). The main features of such convolutional neural networks are known in the art.

Artificial neural networks (ANN) or connectionist systems are computing systems vaguely inspired by the biological neural networks that constitute animal brains. The neural network itself is not an algorithm, but rather a framework for many different machine learning algorithms to work together and process complex data inputs. Such systems "learn" to perform tasks by considering examples, generally without being programmed with any task-specific rules. For example, in image recognition, they might learn to identify images that contain whales by analyzing example images that have been manually labeled as "whale" or "no whale" and using the results to identify whales in other images. They do this without any prior knowledge about whales, e.g., that they have skin, tails, fins and whale-like faces. Instead, they automatically generate identifying characteristics from the learning material that they process. An ANN is based on a collection of connected units or nodes called artificial neurons, which loosely model the neurons in a biological brain. Each connection, like the synapses in a biological brain, can transmit a signal from one artificial neuron to another. An artificial neuron that receives a signal can process it and then signal additional artificial neurons connected to it. In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

The processing module 320 is configured to receive a sequence of images of the at least one camera 315. For each image of the received sequence of images, the processing module 320 is configured to compensate the image using data received from the inertial measurement module 340 and, optionally, the horizon detection as described hereafter. The inertial measurement module 340 comprises at least a gyroscope and may advantageously further comprise an acceleration sensor and/or a magnetometer). The inertial measurement module 340 may be embedded into the same physical entity as the capturing module 310 or may be a separate physical entity embedded on another location on the boat 1. In particular, the inertial measurement module 340 may be an existing module embedded onboard the boat 1.

The processing module 320 is configured to segment the image in order to focus the processing on the water area 3. The processing module 320 is configured to detect and identify known objects 5 using the segmented compensated image.

Such identification is performed by the artificial neural network of the artificial neural network unit. More precisely, the artificial neural network unit is configured to detect at least one object 5 in said received sequence of images, to extract a set of features from said at least one detected object 5, to associate it to a predetermined object class using the network weights stored in memory space of the processing module 320 (or a remote server). These predetermined weights together with the network structure define known classes such as boats, buoys, whales, water, etc. This also enables detection of an object without identification by recognizing that it does not belong to any of these predetermined classes at runtime.

Unlike the classical visual algorithms consisting in applying a few filters using mathematical convolution to the image, extracting minor features from the image (color, shape, texture) and analyzing the results, a CNN (convolutional neural network) stacks a big number of filters into a convolutional layer to detect as many features as possible, and applies more convolutional layers to these features in order to extract much deeper (high-level) features in the image. After extracting the features in the image, the network uses its previous knowledge (from the training) to classify if a specific area/shape in the image is a background (water/sky or land) or effectively an obstacle. It is one of the fastest methods because it factorizes all the object detection steps into one single function.

The processing module 320 is configured to detect unknown objects 5, for example using statistical methods and/or Bayesian inference methods. The processing module 320 is configured to calculate the distance between the boat 1 and each detected and/or identified object 5. The processing module 320 is configured to generate a 2D map indicating the detected and/or identified objects 5, preferably showing the distance D between the boat 1 and each detected object 5.

In order to calculate the distance between the boat 1 and a detected object 5, several methods and embodiments may be use.

In a first embodiment, the system comprises an inertial measurement module 340, coupled to the capturing module 310. The inertial measurement module 340 comprises a gyroscope configured to generate spatial data. The spatial data comprise the angular position of the boat 1 along the roll, pitch and yaw axes of the boat 1, which can be used in particular to measure the angles of the capturing module 310 in respect to a water plane 3 fixed reference coordinate system. The processing module 230 is configured to receive the spatial data from the inertial measurement module 340, calculate the coordinates of the object 5 in a boat reference frame (called "Reference-B CS" hereafter) using the received sequence of images and the received spatial data, and calculate the distance between the boat 1 and the at least one detected object 5 using the calculated coordinates. The calculation of the coordinates of the object in the boat reference frame comprises applying rotations and translations between the at least one object and the capturing module and between the capturing module 310 and the boat reference frame using the received sequence of images, as it will be described hereafter.

On a sailing boat 1, particularly on racing sailing boat 1, the mast 20 may rotate and can be slewed in port and starboard direction to improve the aerodynamic profile of the mast sail assembly in respect to the environmental conditions and hence increase the boat's speed. A schematic drawing of a boat 1 with the mounted capturing module 310 and the chosen Coordinate Systems (CS) can be seen on FIG. 7.

Figure 7:
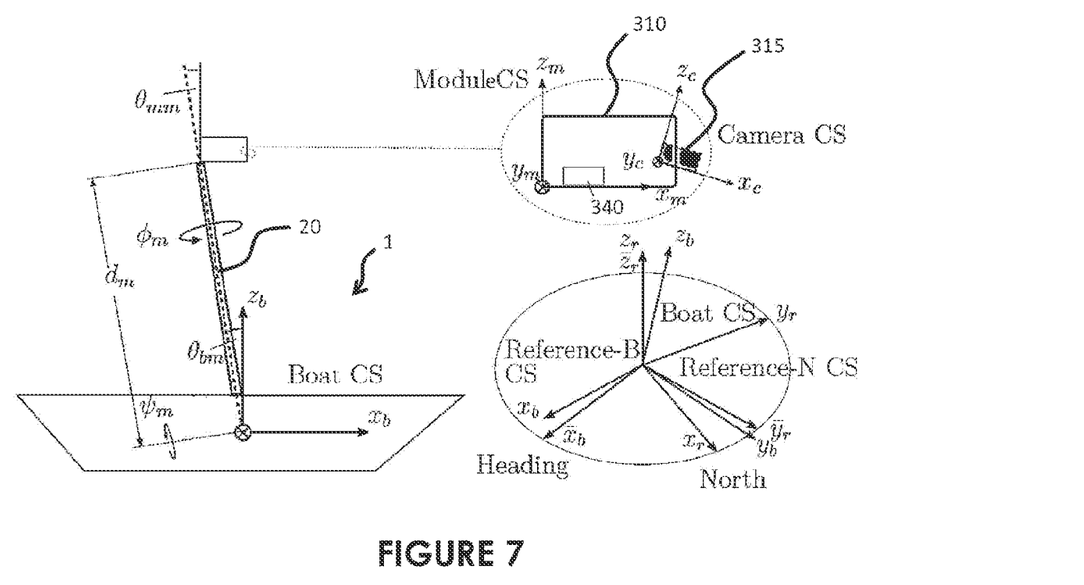
FIG. 7 illustrates coordinate systems used for calculating the distance according to the first embodiment.

The boat 1 reference coordinate system, hereafter called "Boat CS" is placed in the boat's 1 hull, centered at the mast's 20 extension at water level height. That is where—in this simplified boat 1 model—the turning point of the boat 1 is assumed. The xb-axis points form the boat's 1 stern to the bow, the $y_b$-axis points from starboard to port and the $z_b$-axis points upwards along the decks surface normal.

The "Reference-N CS" reference frame is a vehicle-carried north-west coordinate system. It has the same origin as the Boat CS, its $x_r$-axis points toward the geodetic north (reference "North" on FIG. 7), the $y_r$-axis points towards the geodetic west and its $z_r$-axis points upwards along the water surface normal. The rotations of the Boat CS in respect to the Reference-N CS can then be parametrized using the rotation angles $\psi_{r,b}$ (rotation around the $x_r$-axis), $\theta_{r,b}$ (rotation around the $y_r$-axis) and $\Phi_{r,b}$ (rotation around the $z_r$-axis).

The Reference-B CS is the boat reference frame and is a vehicle-carried coordinate system with the same $\bar{z}_r$-axis as the Reference-N CS but with an $\bar{x}_b$-axis pointing along the boat's heading (reference "Heading" on FIG. 7). The boat's rotation in Reference-B CS can be expressed by $\psi_{r,b}$ and $\theta_{r,b}$. A tilt of the mast 20 around the Boat CS's $y_b$-axis is defined by $\theta_{b,m}$. The angle $\psi_{m,r}$ describes the mast's 20 rotation around its longitudinal axis and $\psi_m$ the tilted to each side. Furthermore, the capturing module's 310 bracket is mounted in an angle $\theta_{mm}$ to the mast 20, the Fixture CS system (FIG. 8) is set in the capturing module's 310 mounting point and the Camera CS is set in the camera's 315 suspension. Since the capturing module's 310 bracket is mounted rigidly on the mast 20, the servo has to compensate for mast rotations.

Figure 8:
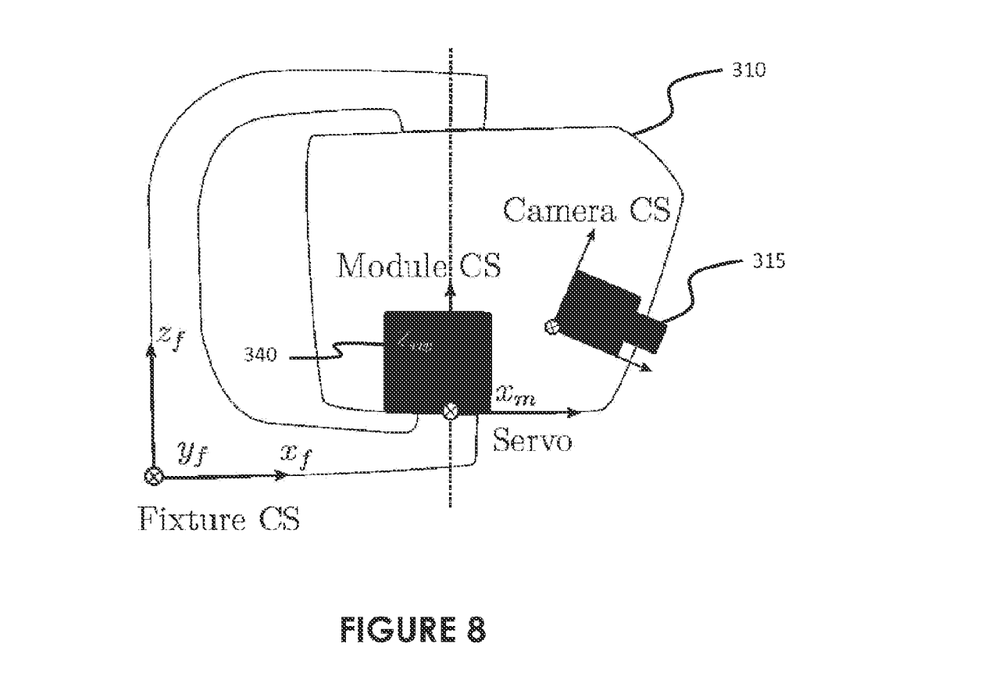
FIG. 8 illustrates coordinates systems of the capturing module.

A schematic drawing of the camera(s) 315 can be seen on the right sketch in FIG. 8. The Fixture CS is set in the point where the bracket is mounted to the mast 20. The Module CS's origin is set at the bottom of the casing and its $z_m$-axis coincide with the servo rotation axis. The position of the left and right cameras 315 in Fixture CS can then be written as:

$$P_f^{ci} = R_{y,\theta_b}(R_{z,\phi_s} d_m^{ci} + d_f^m) \text{ with } i \in [l, r] \quad (2.1)$$

with $d_m^{ci}$ the location of the thermal cameras 315 in the Module CS, $d_f^m$ the location of the Module CS system in respect to the Fixture CS, $\theta_b$ describing the fall of the capturing module 310 due to the bracket and $\Phi_s$ the servo turn. Letters "l" and "r" refer to the left, respectively right, thermal camera 315 when the capturing module 310 uses two symmetrical cameras 315.

The rotation of the cameras 315 in Fixture CS can be expressed by:

$$R_f^{ci} = R_{y,\theta_b} R_{z,\phi_s} \underbrace{R_{z,\phi_{m,ci}} R_{y,\theta_{m,ci}} R_{x,\psi_{m,ci}}}_{R_m^{ci}} \text{ with } i \in [l, r]. \quad (2.2)$$

with the angles $\psi_{m,ci}$, $\theta_{m,ci}$ and $\Phi_{m,ci}$ describing the mounting parameter of the thermal cameras 315 in Module CS. The rotation matrices are of the form:

$$R_{x,\alpha} = \begin{bmatrix} 1 & 0 & 0 \\ 0 & \cos(\alpha) & -\sin(\alpha) \\ 0 & \sin(\alpha) & \cos(\alpha) \end{bmatrix}, R_{y,\alpha} = \begin{bmatrix} \cos(\alpha) & 0 & \sin(\alpha) \\ 0 & 1 & 0 \\ -\sin(\alpha) & 0 & \cos(\alpha) \end{bmatrix} \quad (2.3)$$

$$R_{z,\alpha} = \begin{bmatrix} \cos(\alpha) & -\sin(\alpha) & 0 \\ \sin(\alpha) & \cos(\alpha) & 0 \\ 0 & 0 & 1 \end{bmatrix}.$$

The inertial measurement module 340 comprises a sensor fusion algorithm which fuses the measured data of the integrated acceleration and gyro sensor and derives rotation quaternions describing the orientation of the inertial measurement module 340 sensor chip in respect to the Reference-N CS. Due to a zero calibration of the inertial measurement module 340 sensor in the capturing module 310, the inertial measurement module 340 CS's xy-plain is in parallel to the Module CS's xy-plain. The sensor data is regularly written in an internal FIFO buffer where it is gathered by the capturing module's 310 software during the synchronized reading process. These quaternions are then transformed into roll $\tilde{\Psi}_{r,m}$, pitch $\tilde{\theta}_{r,m}$ and yaw $\tilde{\varphi}_{r,m}$ angles. The rotation matrix between the Reference-N CS and the Module CS can then be written as:

$$\tilde{R}_r^m = R_{z,\tilde{\varphi}_{r,m}} R_{y,\tilde{\theta}_{r,m}} R_{x,\tilde{\Psi}_{r,m}}. \qquad (2.4)$$

Here $R_{z,\tilde{\varphi}_{r,m}}$, $R_{y,\tilde{\theta}_{r,m}}$ and $R_{x,\tilde{\Psi}_{r,m}}$ are rotation matrices of the form 2.3. The raised tilde above a parameter or matrix signalizes that the origin of the data is from the inertial measurement module 340. The capturing module 310 is mounted on the top of the boat's 1 mast 20 at a distance of 10-50 m to the boat 1 of rotation.

The rotation matrices $R_r^b$ and $\overline{R}_r^b$ describe the boat's orientation in Reference-N CS and Reference-B CS respectively. They are a composition of the angles $\psi_{bm}$, $\theta_{bm}$ and $\Phi_{bm}$ and can be formulated as:

$$R_r^b = R_{z,\phi_{bm}} R_{y,\theta_{bm}} R_{x,\psi_{bm}} \text{ and } \overline{R}_r^b = R_{y,\theta_{bm}} R_{x,\psi_{bm}} \qquad (2.5)$$

Considering FIG. 7 and equations 2.5 and 2.1, the kinematic chain of the thermal cameras 315 positions in Reference-N CS and Reference-B CS can directly be formulated as:

$$P_r^{ci} = R_r^b R_{y,\theta_{bm}} R_{x,\psi_m} R_{z,\phi_m} (R_{y,\theta_{mm}} P_f^{ci} + d_b^f)$$

$$\overline{P}_r^{ci} = \overline{R}_r^b R_{y,\theta_{bm}} R_{x,\psi_m} R_{z,\phi_m} (R_{y,\theta_{mm}} P_f^{ci} + d_b^f) \text{ with } i \in [l,r] \qquad (2.6)$$

Here $R_{y,\theta_{bm}}$, $R_{x,\psi_m}$, $R_{z,\phi_m}$ and $R_{y,\theta_{mr}}$ are rotation matrices of the form 2.3 and $d_b^f$ is the translation vector:

$$d_b^f = [0 \ 0 \ d_m]^T \qquad (2.7)$$

containing the extended mast length $d_m$, which may be measured and stored in the processing module e.g. at the factory or by the skipper.

After successively multiplying all the rotation matrices from the Reference-N CS respectively Reference-B CS to the respective Camera CS and considering equation 2.2, the rotation of the cameras 315 in Reference-N CS and Reference-B CS can be formulated as:

$$R_r^{ci} = \underbrace{R_r^b R_{y,\theta_{bm}} R_{x,\psi_m} R_{z,\phi_m} R_{y,\theta_{mm}} R_{y,\theta_b} R_{z,\phi_s}}_{R_r^m} R_m^{ci} \qquad (2.8)$$

$$\overline{R}_r^{ci} = \underbrace{\overline{R}_r^b R_{y,\theta_{bm}} R_{x,\psi_m} R_{z,\phi_m} R_{y,\theta_{mm}} R_{y,\theta_b} R_{z,\phi_s}}_{\overline{R}_r^m} R_m^{ci} \text{ with } i \in [l, r].$$

The matrices $R_r^m$ and $\overline{R}_r^m$ describe the rotation of the capturing module 310 in Reference-N CS and Reference-B CS respectively. In equation 2.8, the unknown matrix is $\overline{R}_r^b$ describes the rotation between Reference-B CS and Boat CS. Since the inertial measurement module 340 and the camera(s) 315 are on top of the mast 20, the matrix $\overline{R}_r^m$, which is used in the distance estimation formula 5.3, may be advantageously derived directly form the sensor fusion algorithm of the inertial measurement module 340 and horizon detection.

Due to permanent movements of the boat 1 in respect to Reference-B CS, the matrix $R_r^b$ or preferably $R_r^m$ needs to be estimated. Therefore, a special implementation fusing the inertial measurement module 340 and an optical horizon detection algorithm is used to derive a more accurate and robust estimation than both methods on their own. Further approaches to derive this matrix can be based on sensors capturing their environment in 3D data such as LIDAR, RADAR and stereo vision. Assuming in the surrounding area of the boat 1 is mostly water, after removing the outliers (other objects, high waves, . . . ), the surface plane of the water may be derived using e.g. least squares method. Taking into account that the water surface is the xy-plane of the Reference-B CS the roll and pitch coordinate can directly be calculated form the plain equation.

For the application of collision avoidance, the position and distance of a potential dangerous object is necessary. In this first embodiment, the capturing module 310 does not comprise any sensors capable of directly measuring distances (e. g. LIDAR, SONAR, RADAR). Therefore, this section describes how to derive the location of objects in a marine environment from image data. A thermal camera 315, as such as an RGB camera 315, projects the three-dimensional environment onto a two-dimensional image plane (reference "Image plane" on FIG. 9). For position and distance estimation, the inverse projection from a two-dimensional space into the real world is of interest. Due to an extra degree of freedom, in comparison to the image plane, without an additional assumption, this projection has no distinct solution. For the open sea application area it can be presumed that every object, which can be in a potential collision course with the boat, is floating on the water surface. Therefore, the points of interest are where the objects hit the water and hence on a plane. The additional constrain leads to a mapping from the two-dimensional image space to the two-dimensional water surface with a unique solution. To derive this projection, in the first step a vector $V_{ci}^{ws}$ with $i \in [l,r]$ in respective Camera CS (for both thermal cameras 315) is transformed in Reference-B CS. A schematic drawing supporting the derivation of the formula is shown on FIG. 9.

With the equations 2.2 and 2.5, the vector can be expressed in Reference-B CS with the following equation:

$$\overline{P}_r^{ws} = \overline{R}_r^b R_{y,\theta_{bm}} R_{x,\psi_m} R_{z,\phi_m} (R_{y,\theta_{mm}} R_{y,\theta_b} (R_{z,\phi_s} (R_m^{ci} V_{ci}^{ws} + d_m^{ci}) + d_f^m) + d_b^f) \text{ with } i \in [l,r] \qquad (5.1)$$

Since the translations in the bracket $d_f^m$ and in the capturing module $d_m^{ci}$ are very small in comparison to the mast 20 height, they have an insignificant influence on the distance estimation and will therefore be neglected. Equation 5.1 can then be simplified to:

$$\overline{P}_r^{ws} = \overline{R}_r^b R_{y,\theta_{bm}} R_{x,\psi_m} R_{z,\phi_m} (R_{y,\theta_{mm}} R_f^{ci} V_{ci}^{ws} + d_b^f) \text{ with } i \in [l,r] \qquad (5.2)$$

and as function of $R_R^m$ derived from the sensor fusion, it can be written as:

$$\overline{P}_r^{ws} = \overline{R}_r^m (R_m^{ci} V_{ci}^{ws} + (R_{y,\theta_{mm}} R_{y,\theta_b} R_{z,\phi_s})^T d_b^f) \text{ with } i \in [l,r]. \qquad (5.3)$$

Indeed, $R_R^m$ is the rotation of the capturing module 310 in a boat 1 fixed reference system where z-axis is in parallel with the normal vector of the water plane 3 and the x-axis pointing in the driving direction (Reference-B CS). It is derived by fusing date of the inertial measurement module 340 with the optical horizon detection algorithm. This is also a matrix which could be derived using LIDAR, RADAR or stereo vision Introducing the $[\overline{u},\overline{v}]$-image coordinate system in the "'Image plane", centered on the optical axis of the respective camera 315, the vector $V_{ci}^{ws}$ can be constructed in the form:

$$V_{ci}^{ws} = \left[1 - \frac{\bar{u}}{f_u} - \frac{\bar{v}}{f_v}\right]^T s \text{ with } i \in [l, r]. \quad (5.4)$$

with the vertical and horizontal focal length $f_v$ and $f_u$ and the scalar s. At this point the idea is to increase the length of the vector $V_{ci}^{ws}$ with the scale factor s until it hits the water surface. The intersection point of the vector and the water plane in Reference-B CS can be expressed as:

$$\bar{P}_r^{ws} = [X \ Y \ 0]^T. \quad (5.5)$$

At this step it would be possible to solve the system of equations 5.3 and derive a solution for X and Y as function of ũ and ṽ. To keep further mathematical expressions as short and clear as possible, 5.3 is expressed as a homogeneous transformation:

$$\begin{bmatrix} \bar{P}_r^{ws} \\ 1 \end{bmatrix} = \underbrace{\begin{bmatrix} \bar{R}_r^m R_m^{ci} & \bar{R}_r^m (R_{y,\theta_{mm}} R_{y,\theta_b} R_{z,\phi_s})^T d_b^f \\ 0 & 1 \end{bmatrix}}_{H_k} \begin{bmatrix} V_{ci}^{ws} \\ 1 \end{bmatrix} \text{ with } i \in [l, r]. \quad (5.6)$$

with Hk written as a general homogeneous matrix:

$$H_k = \begin{bmatrix} R_k & t_k \\ 0 & 1 \end{bmatrix} = \begin{bmatrix} r_{k,11} & r_{k,12} & r_{k,13} & r_{k,1} \\ r_{k,21} & r_{k,22} & r_{k,23} & r_{k,2} \\ r_{k,31} & r_{k,32} & r_{k,33} & r_{k,3} \\ 0 & 0 & 0 & 1 \end{bmatrix}. \quad (5.7)$$

The solution of equation 5.6 can be written in the short form:

$$s = -\frac{t_{k,3} f_u f_v}{r_{k,31} f_u f_v - r_{k,32} u f_v - r_{k,33} v f_u} \quad (5.8)$$

$$X = t_{k,1} + \left(r_{k,11} - \frac{r_{k,12} \tilde{u}}{f_u} - \frac{r_{k,13} \tilde{v}}{f_v}\right) s.$$

$$Y = t_{k,2} + \left(r_{k,21} - \frac{r_{k,22} \tilde{u}}{f_u} - \frac{r_{k,23} \tilde{v}}{f_v}\right) s.$$

and the distance to the boat's bow is:

$$d_{bo} = \sqrt{(X - d_{mb})^2 + Y^2}. \quad (5.9)$$

Here $d_{mb}$ is the distance from the Reference-B CS's center to the boat's 1 bow. To derive the distance for a point in [u,v]-image CS centered in the left upper corner of the image, as usually used in computer vision, the coordinate transformation:

$$\tilde{u} = u - \frac{n}{2}, \tilde{u} = v - \frac{m}{2} \quad (5.10)$$

is inserted in 5.8. Here, (m×n) corresponds to the image size. The calculation time of the distance estimation, slightly dependent on the amount of detected objects (after calculating the homogeneous matrix Hk only equation 5.8 need to be evaluated for each object), is ~5 ms on the regarded platform.

In a second embodiment, the system may be deprived of inertial measurement module 340 and the processing module 320 is configured to detect the horizon in the received sequence of images, to determine the number of pixels lying between said detected horizon and the at least one detected object and to estimate the distance between the boat 1 and the at least one detected object 5 using said number of pixels. This consists in correlating each pixel with a position in the environment by considering that the water plane 3 is flat. By combining this relative position with GPS data, for example available on the boat 1 navigation bus, it is then possible to assign an absolute position to each pixel. Tracking an object through several images with time stamps allows to calculate speed and course of the object 5 with a tolerance dependent of the distance to the camera 315. For the distance calculation, the lowest part of the object 5 may be taken as a reference as it is assumed that water is flat and that the object 5 water line is lowest part of the object 5 itself. Counting the number of pixels between the horizon and the object 5 on the image allows thus estimating the distance between the capturing module 310 and the object 5.

In a third embodiment, the system comprises a LIDAR or a RADAR or a stereo vision device configured for measuring 3D environmental data and estimating the inclination of the capturing module 310, e.g. in an open sea scenario, by delivering 3D point clouds of the environment, mostly consisting of the water plane, to derive said water plane 3 by removing outliers (e.g. using an algorithm like e.g. RANSAC and in addition the plane could simply be calculated using least squares method), and taking into account that the water surface is the xy-plane of the boat 1 reference coordinate system or frame to calculate the inclination of the capturing module 310 from said plane equation.

The processing module 320 is configured to track each detected and/or identified object 5 and calculate a collision probability as well as a heading of the object to follow by the boat for avoiding the detected and or identified objects. In this context a tracking by detection approach is used in order to enrich the feature space with the knowledge gained from similarity of objects in time. Firstly, a multi-instance multi-object observer is used for the solution of the assignment problem among possible objects and detections. Given that the CNN-based detectors suppress false positives in an important manner, a localization phase occurs by considering the probability of existence of an object, changing it adaptively given the fact that it was not detected anymore. Condition of existence is nevertheless thresholded to a given number of continuous detections. A modular generic framework is used for extracting a local customized appearance model, which is then learned in time as means of a confirmation approach for the existence of each object. This method ensures not only tuning flexibility for any kind of situation given but also an end to end framework capable to boost the accuracy of the detectors or combinations of them. The tracker function of the processing module 320 is instantiated several times in the architecture to ensure appropriate adaptability to the inference dynamics of the detectors or combinations of them.

The processing module 320 is configured to, when tracking the objects, calculate collision probabilities and avoidance trajectories. With the help of the tracker, speed and direction of the detected objects relative to the boat 1 are calculated. If the speed vector of the object is centered on the boat within a tolerance a collision is likely to happen. Depending on the boat 1 type (monohull, catamaran, trimaran, motor boat) and for sailing boats on the wind direction and force, the system will communicate a course deviation or stop the boat 1 depending on the severity of the collision threat.

When detecting unknown objects 5, for example using statistical methods and/or Bayesian inferences methods, such detection being known from the person skilled in the art, it will not be further detailed here. Of course, any other relevant method may be used to detect unknown objects 5.

In a preferred embodiment, the processing module 320 is configured for sending navigation data to an electronic control module of the boat 1 in order to automatically (i.e. without anyone's action) modify the trajectory of the boat 1 and therefore avoid colliding with the detected or identified object 5.

The processing module 320 is configured to send the information on the identified object 5 to the application module. The application module 330 is configured to display the information related to the detected or identified object received from the processing module 320. In a preferred embodiment, the application module 330 is embedded on a mobile user equipment, such as e.g. a smartphone, a tablet, a PC, a connected watch or any adapted mobile user equipment.

Figure 6:
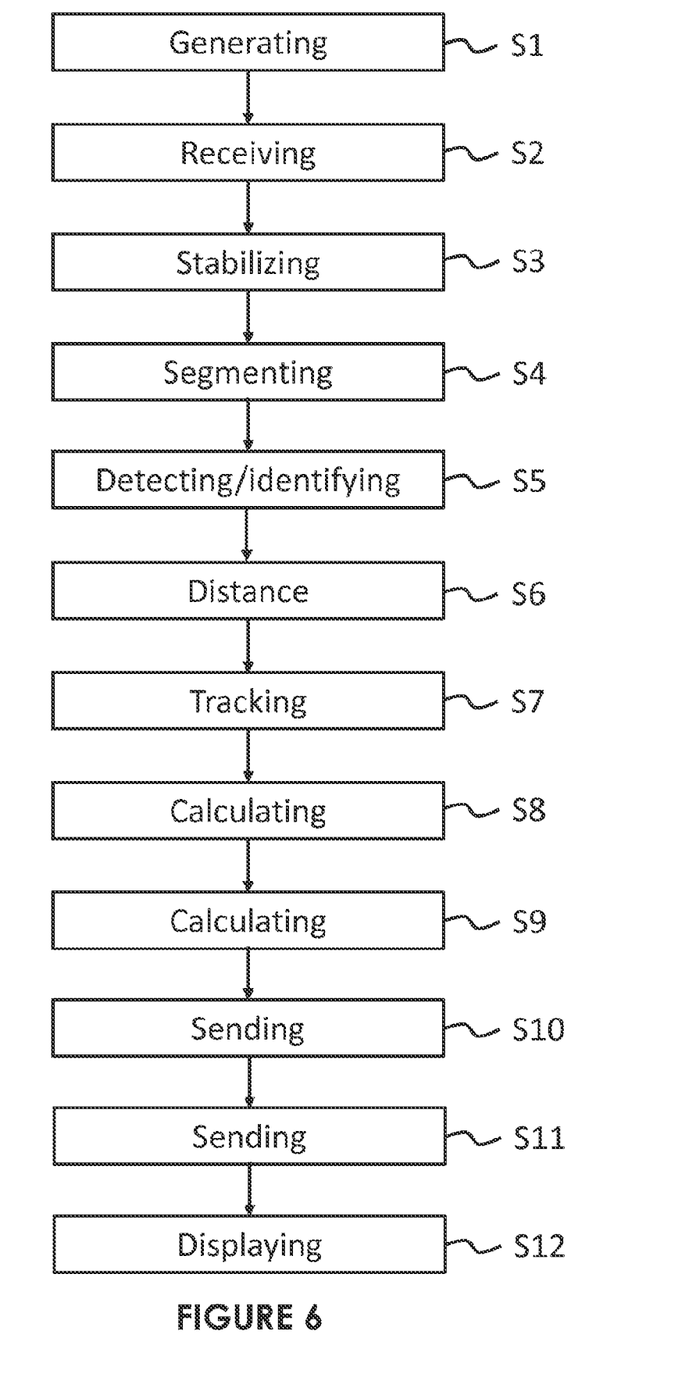
FIG. 6 illustrates an exemplary embodiment of the method according to the invention.

An example of use of the system 30 will now be described in reference to FIG. 5 and FIG. 6. The example relates to the system 30 described on FIG. 5 wherein the capturing module 310 comprises one RGB camera 315 and two thermal cameras 315.

In a step S1, each camera 315 of the capturing module 310 generates a sequence of images of and sends said sequence to the processing module 320, preferably in real time and in a continuous video flow.

Upon reception of the images of sequences in a step S2, the processing module 320 compensates each image in a step S3 using data received in parallel in real time and continuously from the inertial measurement module 340. The compensation consists in receiving or calculating the inclination angle between the capturing module 310 (or the boat 1) and the terrestrial horizontal axis (i.e. the horizon) in order to turn each image accordingly so that the image displays a layout which is horizontal (i.e. elements displayed in the image are shown as they are in reality, not shifted). Such compensation allows for estimating precisely the distance between the boat 1 and the object 5 as described hereafter. Such compensation allows to enhance the quality of the object tracking by adding a position-related filter to recognize the same object in consecutive images.

The processing module 320 then segments each received image in a step S4. In a step S5, the processing module 320 detects the objects 5 in each segmented image and identify the objects 5 when said objects are known from its database using the segmented compensated image. In particular, the artificial neural network unit extracts a set of features from each object and compare said extracted set of features with at least one predetermined set of features, said at least one predetermined set of features being stored in a memory and being associated with a predefined object. The artificial neural network unit identifies an object when the extracted set of features matches with the at least one predetermined set of features. More precisely, the kernels of the neuronal network (i.e. the tuneable weights) are tuned during training time using the annotated database. Therefore, a cost function punishing the deviation of the prediction of the network and the annotated ground-truth is minimized As a result the trained network on the platform is able to detect known object categories while also being able to generalize until a certain extend. The detection of unknown objects may be done, for example, using statistical methods and/or Bayesian inferences methods.

In a step S6, the processing module 320 calculates the distance between the boat 1 and each object 5 by receiving the spatial data from the inertial measurement module 340, calculating the coordinates of the object 5 in a boat reference frame using the received sequence of images and the received spatial data, and calculating the distance between the boat 1 and the detected object 5 using the calculated coordinates as explained here before.

Advantageously, the processing module 320 may generate a 2D map indicating the detected and/or identified objects, preferably showing the distance between the boat 1 and each detected object 5. The distance of each detected object 5 may be computed by the processing module 320 by first detecting the horizon in each image supported by the measured inclination of the capturing module (which is one of the data sent by the inertial measurement module 340). Using the horizon detection (which comprises an accurate roll and pitch angle of the inclination of the capturing module 310) and the kinematic relationships on the boat 1 and in the capturing module 310, the position of the object 5 on the water surface can be derived. It results that the more the object 5 appears far from the horizon, the closer it is from the boat 1. Using the horizon the determine the distance allows improving the estimation of the distance, for example by calculating the mean of the distance calculated using the images and the coordinates transformations and the distance calculated using the horizon.

Alternatively, sensor system measuring the environment in 3D like stereoscopic or LIDAR or RADAR system could also be used alone or combined with the coordinate calculations or horizon calculations to evaluate the distance of objects 5, but only for small distances, e.g. less than 50 meters whereas the horizon detection method allows detecting objects up to 200 meters or more. However, the 3D measurements of the surrounding area can be used to derive the inclination of the capturing module 320 supporting the distance estimation allowing to derive the position of object 5 on the water plane even if the horizon does not appear in the image. Another approach which does not demand any horizon detection may consist in using data received from the inertial measurement module 340 to determine the inclination of the camera with respect to the terrestrial vertical. Together with the known kinematic relationships on the boat (mounting position of the capturing module 320 on the mast, mounting angles and distance from the mast root to the bow of the boat), the distance can be calculated as explained before.

In a step S7, the processing module 320 tracks each detected and/or identified object.

In a step S8, the processing module, when tracking the objects, calculates collision probabilities and avoidance trajectories.

In a step S9, the processing module 320 calculate a heading to follow by the boat for avoiding the detected and or identified objects 5.

The trajectory of the boat 1 may be computed by the processing module 320 knowing gyroscope data collected from the boat internal network such as GPS data, compass data, wind data, depth data and the geographical location of the boat 1.

In a step S10, the processing module 320 sends navigation data, such as e.g. the distance and position of the detected objects 5 and the calculated heading for the boat 1, to an electronic control module (not shown) of the boat 1 in order to automatically (i.e. without anyone's action) modify the trajectory of the boat 1 and therefore avoid colliding with the detected or identified object(s) 5. The processing module 320 may also compute and send autopilot commands or engine commands to the electronic control module to automatically modify the trajectory of the boat 1 and avoid the object 5, for example a ±10° deviation command or an engine power decrease command (in % of the maximum engine power). When the autopilot of the boat 1 is off, an alarm may be triggered to warn the skipper that the path of the boat 1 should be modified.

In a step S11, the processing module 320 sends the information on the detected or identified object(s) 5 to the application module 330. The application module 330 displays in a step S12 the information related to the identified object received from the processing module. For example, the processing module 320 may display a 2D or a 3D map indicating the detected and/or identified objects 5.

The invention allows therefore identifying objects that are an at least partially immerged in water, for example in order to avoid said object or to prevent said object to penetrate into a restricted area.

The invention claimed is:

1. A system for determining a distance between a boat and at least one object at least partially immerged in a water area, said system comprising:
a capturing module, configured to be mounted on said boat, said capturing module comprising at least one camera, said at least one camera being configured to generate at least one sequence of images of said water area, a processing module, configured to be embedded onboard said boat, said processing module being configured to receive the at least one sequence of images from said at least one camera, to detect at least one object in said at least one received sequence of images, to determine rotation component values of the at least one camera in a boat reference frame, wherein said boat reference frame is vehicle-carried and comprises a plane defined by the water area and a vertical axis normal to said plane, and to determine the distance between the boat and the at least one detected object using said rotation component values by doing a mapping from a two-dimensional image space to a two-dimensional water surface, said mapping including an inverse projection from said two-dimensional image space to said two-dimensional water surface.

2. The system according to claim 1, said system comprising an inertial measurement module, coupled to the capturing module, said inertial measurement module comprising a gyroscope configured to generate spatial data, said spatial data comprising the angular positions of the boat along the roll, pitch and yaw axes of the boat, the processing module being configured to:
receive the spatial data from the inertial measurement module,
calculate the coordinates of the at least one object in a boat reference frame using the received sequence of images and the received spatial data,
calculate the distance between the boat and the at least one detected object using the calculated coordinates.

3. The system according to claim 2, wherein the calculation of the coordinates of the at least one object in the boat reference frame comprises applying rotations and translations between coordinate systems of the image plane of the at least one camera and the capturing module using the received sequence of images and between the capturing module and the boat reference frame.

4. The system according to claim 1, wherein the processing module is configured to detect the horizon in the received sequence of images and to determine the inclination of the capturing module in respect to the water surface of the water area.

5. The system according to claim 1, wherein said system comprises a LIDAR or a RADAR or a stereo vision device configured for measuring 3D environmental data and estimating the inclination of the capturing module by delivering 3D point clouds of the water plane to derive said water plane by removing outliers.

6. The system according to claim 1, wherein the processing module is configured to identify the at least one detected object.

7. The system according to claim 6, wherein the processing module comprises at least one artificial neural network for detecting at least one object, said at least one artificial neural network being configured to detect the at least one object in the at least one received sequence of images, to extract a set of features from said at least one detected object, to compare said extracted set of features with at least one predetermined set of features associated with a predefined object, and to identify the at least one detected object when the extracted set of features matches with the at least one predetermined set of features.

8. The system according to claim 1, said system comprising an inertial measurement module configured to provide spatial data, said spatial data comprising at least the inclination angle, relatively to the terrestrial horizontal axis, of the support on which the capturing module is mounted.

9. The system according to claim 8, wherein the processing module is configured to receive the inclination angle and to compensate each image of the sequence of images using the received inclination angle.

10. The system according to claim 1, wherein the processing module is configured to detect the horizon in each image of the sequence of image.

11. The system according to claim 1, wherein the at least one camera is a RGB camera or a thermal camera.

12. The system according to claim 1, wherein the capturing module comprises at least one RGB camera and at least one thermal camera.

13. The system according to claim 1, wherein the processing module is configured to track the at least one identified object in the at least one sequence of images.

14. A boat comprising the system according to claim 1.

15. A method of determining a distance between a boat and at least one object at least partially immerged in a water area, said method comprising: generating at least one sequence of images of said water area, detecting at least one object in said at least one received sequence of images, determining rotation component values of the at least one camera in a boat reference frame, wherein said boat reference frame is vehicle-carried and comprises a plane defined by the water area and a vertical axis normal to said plane, and determining the distance between the boat and the at least one detected object using said rotation component values by creating a mapping from a two-dimensional image space to a two-dimensional water surface, said mapping including an inverse projection from said two-dimensional image space to said two-dimensional water surface.

* * * * *